United States Patent Office 2,841,426
Patented July 1, 1958

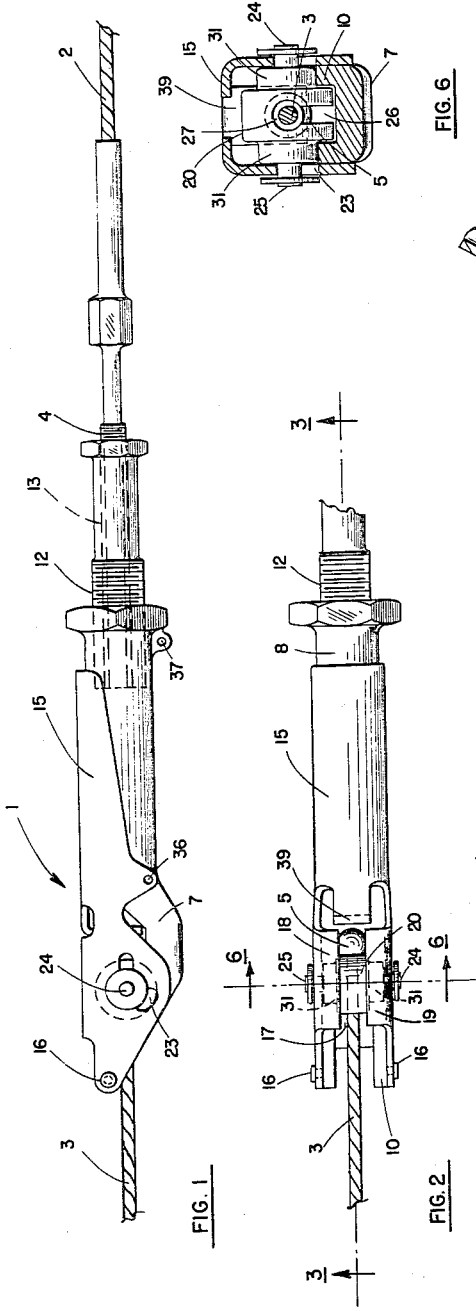
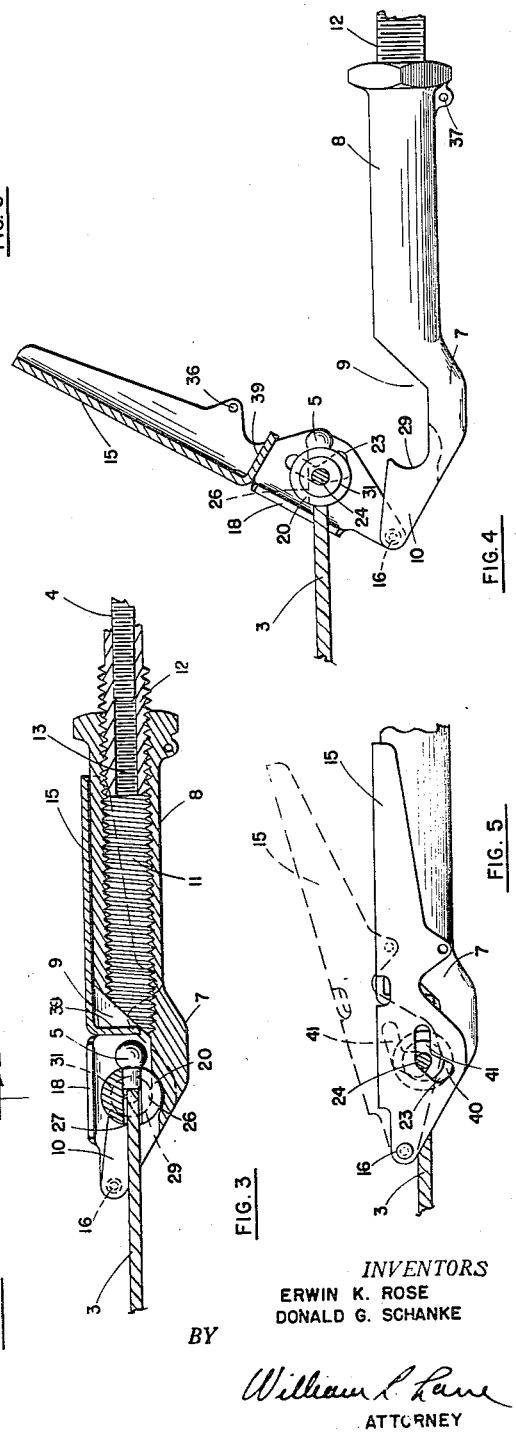

2,841,426
CABLE COUPLING

Donald G. Schanke and Erwin K. Rose, Los Angeles, Calif., assignors to North American Aviation, Inc.

Application November 23, 1953, Serial No. 393,855

6 Claims. (Cl. 287—76)

This invention pertains to a cable coupling and more particularly to a coupling of adjustable, quick disconnect type.

Couplings of the general type of this invention may be used in any instance where it is desired to interconnect two cables, but are particularly adaptable for use with an aircraft. Normally in an aircraft there are many control cables which run throughout the interior of the ship, passing through and around various bulkheads and reinforcing members. Often the cables must pass through openings of restricted size so that there is generally a close clearance around the cables. Such cables are often made in sections so that two or more lengths of cable must be joined together in order to form one longer operative control medium. The ends of these cable sections should naturally be as small as possible, without projections, so that they may be easily passed through the restricted openings provided in the interior of the aircraft. Furthermore, a certain tension must be maintained in these cables so that movement thereof will be positive and uniform. A means should therefore be provided to allow for adjusting the tension of the cables so that it may be maintained at the proper value regardless of initial manufacturing tolerances or subsequent stretching of the cable material.

It has been customary in the prior art to provide a clamping device which will unite two cable ends. Generally these devices require a T-shaped fitting to be installed on the end of one of the cables, which fitting engages slots in the cable coupling so as to join the two sections. The T-shaped fitting has lateral projections which naturally take up a good deal of room so that it may be difficult to fit such cables through the narrow clearances provided in the interior of a normal aircraft. Furthermore, the T-shaped end must be rotated to engage the slots, which adds to the complexity of assembling the cable connector.

It is accordingly an object of this invention to provide a strong, light and compact cable coupling.

Another object of this invention is to provide a cable coupling requiring relatively small cable end fittings.

An additional object of this invention is to provide a cable coupling which may be very easily assembled.

A further object of this invention is to provide a cable coupling which is adjustable to provide a desired tension in the cables which are joined.

These and other objects will become apparent from the following detailed description taken in connection with the accompanying drawing in which:

Fig. 1 is a side elevational view of the coupling of this invention in an assembled position;

Fig. 2 is a top plan view of the assembled coupling;

Fig. 3 is a sectional view taken along line 3—3 of Fig. 2;

Fig. 4 is a sectional view illustrating the clamping member in an open position;

Fig. 5 is a fragmentary view illustrating the slots for mounting the cross member; and Fig. 6 is an enlarged sectional view taken along line 6—6 of Fig. 2.

Referring to the drawing, coupling 1 of this invention is adapted to join together cables 2 and 3. These may be conventional aircraft control cables of woven flexible construction. Cable 2, for use with the coupling of this invention, is provided with a threaded end portion 4. A ball fitting 5 is swaged or otherwise secured to the end of cable 3. The function of these cable ends will be more fully described below.

Coupling 1 includes a main load-carrying member 7 which is provided with a cylindrical portion 8 at one end thereof, a receptacle portion 9 adjoining the cylindrical portion, and a bifurcated open portion 10 at the other end. Portion 8 is provided with an internally threaded bore 11 which is adapted to receive the externally threaded portion of a second member 12. Member 12 is also internally threaded, as at 13, but the internal threads are opposite in direction from the threads on the exterior of member 12, and the threads on the interior of cylindrical portion 8. Thus, if the interior of member 12 is provided with a right-hand thread the exterior thereof, as well as bore 11 of member 7, has a left-hand thread. Member 12 receives threaded cable end 4 so that when the cable is secured in member 12, and member 12 in turn is threaded within cylindrical portion 8, tension loads on the cable may be transmitted to the main load-carrying member 7.

A clamping or handle member 15 is pivotally secured at 16 to opposite open bifurcated end 10 of member 7. This handle has an open-sided construction, portions of which are substantially complementary to member 7. This handle is, therefore, adapted to assume an open position such as shown in Fig. 4 wherein the handle is remote from the load carrying member 7, and also may assume a closed position wherein member 7 is received within member 15 which lies adjacent thereto. Near the pivotal connection 16 of the handle to member 7, member 15 is open as indicated at 17. Flanges 18 and 19 are provided along the periphery of this open portion to give the handle additional strength.

Pivotally carried by handle member 15 is a cross member 20. The connection with member 20 is effected by means of slot 23 in the handle which receives projecting pins 24 and 25 of cross member 20. Member 20 is provided with an elongated slot 26 in one side thereof extending in the direction of the plane of the axis of member 15. This slot may include an enlarged bottom portion 27 whereby cable end 3 may fit within this slot. When the cable is so installed, ball end 5 engages cross member 20 beyond the slot so that cable end 3 is retained within member 20 against tension loads thereon. Open portion 17 of member 15 permits ready fitting of cable end 3 within the slot in the cross member when the handle is in the open position of Fig. 4.

In attaching the two cable ends together, cable end 2 is initially attached to member 7 by means of threaded member 12 while the handle is disposed in an open position. Cable end 3 is then inserted within slot 26 in cross member 20 and the handle is subsequently pivoted to the closed position. When handle member 15 is so pivoted to the closed position, wherein it lies adjacent to member 7, cross member 20 is brought within receptacle portion 9 of member 7.

Receptacle portion 9 includes shoulder 29 at one end thereof, which can best be seen in Fig. 4. When the handle is moved to the closed position and cross member 20 is thereby brought within the receptacle, bearing portion 31 of the cross member is brought into engagement with shoulder 29 so that tension loads on cable end 3 will no longer be taken by the handle, but will be transmitted directly by means of cross member 20 to main load carrying member 7. It is thus a simple matter to unite the two cable ends by means of first threading one into the main load carrying member and then pivoting the other into engagement with the load carrying member by means of the handle 15. It should be observed that when cross member 20 is disposed within the receptacle upon completion of the pivotal movement of the handle it has passed in an over dead center relationship with pivot point 16 of the handle. This means that the handle will readily snap into a fully closed position. The tension loads on cable end 3 then tend to maintain the handle in the closed position, rather than tending to open the handle.

Apertured tabs 36 and 37 may be provided to facilitate safety wiring the parts in the assembled position with the handle closed. For a further safety feature, tab 39 projects downwardly adjacent open portion 17 of handle 15 so as to block off threaded bore 11 of member 7 to prevent possible entry of ball end 5 therein. In this manner tab 39 will prevent cable end 3 from disengaging member 20 should the tension on the cables be relaxed.

After the handle has been moved to the closed position and prior to safety wiring of the member 12 and to member 7, adjustment of cable tension may be obtained. Rotation of member 12 in the proper direction will draw this member further into threaded bore 11 of member 7. At the same time, by virtue of the fact that the interior of member 12 is threaded in the opposite direction, this will draw threaded cable end 4 further within the bore of member 12, tightening the cable tension. This allows considerable adjustment of cable tension in a relatively short axial distance. Naturally rotation of member 12 in the opposite direction will permit loosening of the cable should that be desired.

It is thus apparent from the foregoing description that we have provided a cable coupling which is very quickly and easily installed and yet is compact in design. Full adjustment of cable tension is permitted in a minimum of longitudinal distance. The locking action is positive by virtue of the over-center connection between cross member 20 and the pivot point of handle 15. One of the principal advantages of this coupling resides in fact that only slightly enlarged cable end fittings are necessitated. Thus ball end 5 of cable 3 is only a small amount larger than the cable diameter itself there being no long protuberances as with the case of a T-shaped fitting on the end of the cable. This means that the cable can be drawn through the small clearances provided within the interior of an aircraft without difficulty from interference with the other structural members within the aircraft. Also this ball end arrangement, together with the slotted member 20, permits a very simple installation in which the cable end is merely dropped within the slot with the ball beyond the slot whereby it is very positively and firmly held against tension loads thereon. It is not necessary to rotate the cable end.

Disassembly of the coupling is also easily effected. By virtue of the fact that cross member 20 is pivotally connected to the handle in slots, it is possible to raise the handle a certain amount provided by the clearance of the slots prior to actual movement of the cross member from the receptacle and its engagement with shoulder 29. This position of the handle is illustrated in phantom in Fig. 5. This means that the handle can be pried up to a position where it can be conveniently gripped before any appreciable force is required for its movement. It should be observed that the slot 23 is relieved at 40 so that the periphery of this portion of the slot is nearer pivotal connection 16 of the handle than to member 7. As a result, when the cross member is withdrawn from the receptacle it must slide along shoulder 29 so that there is an appreciable resistance to its disengagement therefrom. This is a further safety feature to guard against inadvertent disconnecting of the coupling. The cross member thus rides out of the recess on the bottom portion of the slot and along the sides of shoulder 29. The shape of the slots also means that on assembly the cross member will ride in the top portion 41 of the slots which is further from pivot 16, whereby it can be easily carried beyond the shoulders when the handle is moved to the closed position. This permits ready handle closing while at the same time affording resistance to handle opening. When the handle is closed the cross member drops into the receptacle and the shoulders engage the cross member as described above so that there is no longer a load taken by the top portion of the slots of the handle.

The foregoing detailed description is to be clearly understood as given by way of illustration and example only, the spirit and scope of this invention being limited only by the appended claims.

We claim:

1. A cable coupling comprising a first holding means having an end adapted to receive and hold a first cable end; a clamping member having an open side receiving said first holding means, said clamping member being pivotally connected to the opposite end of said first holding means; and a second holding means pivotally connected to said clamping member and having an opening therein defined by a shoulder for receiving and holding the end of a second cable, said first holding means having a shoulder engaging said second holding means for assuming tension loads on said second cable.

2. A device as recited in claim 1 in which said pivotal connection of said second holding means to said clamping member includes a slot in said clamping member engaged by said second holding means, said slot including a first surface for engaging said second holding means during movement of said clamping member from a position remote from said first holding means to a position adjacent thereto and permitting substantially unimpeded movement of said second holding means during such movement of the clamping member, said slot including a second surface for engaging said second holding means during movement of the clamping member from a position adjacent to said first holding means to a position remote therefrom.

3. A cable coupling for connecting a first cable and provided with a threaded portion, and a second cable end having a relatively small enlarged portion, said device comprising a tension adjusting member having internal threads receiving said threaded portion of said first cable end, and external threads in the opposite direction; an elongated member having an internally threaded end portion for receiving said external threads of said tension adjusting member, said elongated member being further provided with a shoulder portion near the opposite end thereof; a clamping member pivotally connected to said opposite end, said clamping member having a hollow open-sided construction receiving said elongated member therein; and a cross member having a slot therein and a shoulder adjacent thereto, said slot receiving said second cable with said enlarged end engaging said shoulder of said cross member, said cross member being pivotally connected to said clamping member and engaging said shoulder portion of said elongated member, whereby said elongated member assumes tension loads of both said first and second cables.

4. A cable coupling comprising a first member having threaded means receiving and holding a threaded cable end, said first member being further provided with a receptacle portion defining a shoulder beyond said threaded portion, and a bifurcated end portion; a clamping member pivotally connected to said bifurcated end portion assuming a closed position alongside said first member; and a retention member pivotally carried by said clamping member, said retention member having a shoulder and a slotted portion receiving the end of a cable having an enlarged portion with said enlarged portion engaging said shoulder of said retention member, said retention member being retained in said receptacle portion engaging said shoulder of said first member, whereby said shoulders of said first member and said retention member assume tensions of both said cables.

5. A cable coupling comprising a first member, said member having threaded means receiving and adjustably holding a threaded end of a first cable, the other end portion of said first member having a recess communicating with a bifurcated section having a shoulder portion adjacent said recess; a handle member pivotally connected to said bifurcated portion beyond said shoulder portion, said handle member having a hollow open-sided construction assuming a position enclosing said first member, said handle being further provided with an open wall disposed opposite said recess; and a cross member pivotally connected to said handle member at the location of said open wall, said cross member being retained in said recess of said first member in engagement with said shoulder portion, said cross member having a shoulder and a recess adjacent thereto receiving a second cable having an enlarged end with said enlarged end engaging said shoulder of said cross member, whereby the tensions of both said cables are assumed by the said cross member and said first member.

6. A device as recited in claim 5, in which said pivotal connection of said cross member to said handle member includes slots in said clamping member engaged by said cross member, said slots including first surfaces for engaging said cross member during movement of said handle member from a position remote from said first member to a position adjacent thereto, said first surfaces being positioned to permit substantially free movement of said cross member during such movement, said handle member having second surfaces in said slot for engaging said cross member upon movement of said handle member away from said adjacent position, said second surfaces being positioned to cause said cross member to drag on said shoulder portion during such movement of said handle member away from said adjacent position for providing resistance to such latter movement.

References Cited in the file of this patent
UNITED STATES PATENTS

| | | |
|---|---|---|
| 759,305 | Nunn | May 10, 1904 |
| 925,448 | Boyden | June 22, 1909 |
| 2,320,546 | Shakespeare | June 1, 1943 |
| 2,359,492 | Rockwood | Oct. 3, 1944 |
| 2,628,855 | Cushman | Feb. 17, 1953 |